US011605025B2

(12) United States Patent
Peh et al.

(10) Patent No.: US 11,605,025 B2
(45) Date of Patent: Mar. 14, 2023

(54) AUTOMATED QUALITY CHECK AND DIAGNOSIS FOR PRODUCTION MODEL REFRESH

(71) Applicants: MSD International GmbH, Singapore (SG); MSD Czech Republic s.r.o., Prague (CZ)

(72) Inventors: Yingqi Peh, Singapore (SG); Kah Hin Chin, Singapore (SG); Shao Ying Choo, Singapore (SG); Sucitro Dwijayana Sidharta, Singapore (SG); Richard Dobis, Prague (CZ)

(73) Assignees: MSD International GmbH, Singapore (SG); MSD IT Global Innovation Center s.r.o., Prague (CZ)

( * ) Notice: Subject to any disclaimer, the term of this patent is extended or adjusted under 35 U.S.C. 154(b) by 260 days.

(21) Appl. No.: 16/874,232

(22) Filed: May 14, 2020

(65) Prior Publication Data

US 2020/0364618 A1 Nov. 19, 2020

Related U.S. Application Data

(60) Provisional application No. 62/847,502, filed on May 14, 2019.

(51) Int. Cl.
*G06N 20/00* (2019.01)
*G06F 17/18* (2006.01)

(52) U.S. Cl.
CPC ............. *G06N 20/00* (2019.01); *G06F 17/18* (2013.01)

(58) Field of Classification Search
CPC .......... G06N 20/00; G06N 20/20; G06N 3/08; G06N 7/005; G06N 7/02; G06N 3/088; G06N 3/02; G06Q 10/0635
See application file for complete search history.

(56) References Cited

U.S. PATENT DOCUMENTS 7,092,922 B2 8/2006 Meng et al.
10,402,726 B1 * 9/2019 Moore ................ G06F 3/04842
(Continued)

OTHER PUBLICATIONS

Kang, B.-S. et al., "Integrated machine learning approaches for complementing statistical process control procedures," Decision Support Systems. Jul. 2000. pp. 59-72, vol. 29, No. 1.
(Continued)

*Primary Examiner* — Roberto Borja
(74) *Attorney, Agent, or Firm* — Fenwick & West LLP

(57) ABSTRACT

As a data science project goes into the production stage, model maintenance to maintain model quality and predictive accuracy becomes a concern. Manual model maintenance by data scientists can become a time- and labor-intensive process, especially for large scale data science projects. An early warning system addresses this by performing systematic statistical and algorithmic checks for prediction accuracy, stability, and model assumption validity. A diagnostic report is generated that helps data scientists to assess the health of the model and identify sources of error as needed. Well-performing models can be automatically deployed without further human intervention while poor performing models trigger a warning or alert to the data scientists for further investigation and may be removed from production until the performance issues are addressed.

20 Claims, 7 Drawing Sheets

400

| Rule No. | Rule Name | Rule Family | Model Types | Criticality | Warning Score |
|---|---|---|---|---|---|
| 1.1 | Model Goodness-of-fit Metrics-General | Goodness-of-fit | S, ML | Critical | 20 |
| 1.2 | Model GOF Metrics-Forecast | Goodness-of-fit | F | Critical | 20 |
| 1.3 | Model Fit Information Criterion | Goodness-of-fit | S, F | Warning | 1 |
| 1.4 | Model Residual Distribution Check | Goodness-of-fit | S, ML, F | Warning | 1 |
| 1.5 | Model Residual Distribution Normality Check | Goodness-of-fit | S, F | Warning | 1 |
| 1.6 | Model Residual Autocorrelation Check | Goodness-of-fit | S, F | Warning | 1 |
| 1.7 | Model Residual Stationarity Check | Goodness-of-fit | F | Warning | 1 |
| 1.8 | Change In Seasonality Check | Goodness-of-fit | F | Warning | 1 |
| 1.9 | Theil Inequality Coefficient Check | Goodness-of-fit | F | Warning | 1 |
| 1.10 | Model Coefficient Value Check | Goodness-of-fit | S, F | Warning | 1 |
| 1.11 | Model Coefficient Significance Check | Goodness-of-fit | S, F | Warning | 1 |
| 2.1 | Model Prediction Accuracy Check | Prediction Accuracy | ML, S | Warning | 1 |
| 2.2 | Forecast Accuracy Check | Prediction Accuracy | F | Critical | 10 |
| 3.1 | Model Prediction Stability Check | Prediction Stability | ML, S | Critical | 10 |
| 3.2 | Forecast Stability Check | Prediction Stability | F | Critical | 10 |
| 4.1 | Input Data Structure Check | Input Data | S, ML, F | Critical | 10 |
| 4.2 | Input Data Historical Periods Check | Input Data | S, ML, F | Warning | 1 |
| 5.1 | Business Assumption Check | Business Assumption | S, ML, F | Warning/Critical | NA |

S: Statistical, ML: Machine Learning, F: Forecasting

(56) References Cited

U.S. PATENT DOCUMENTS

| | | | |
|---|---|---|---|
| 2008/0133500 A1* | 6/2008 | Edwards | G06F 16/958 707/999.005 |
| 2009/0106178 A1* | 4/2009 | Chu | G06N 20/00 706/14 |
| 2012/0191631 A1* | 7/2012 | Breckenridge | G06N 20/00 706/12 |
| 2015/0073981 A1* | 3/2015 | Adjaoute | G06Q 20/4016 705/39 |
| 2017/0061326 A1* | 3/2017 | Talathi | G06K 9/6267 |
| 2018/0314975 A1* | 11/2018 | Zang | G06N 20/20 |
| 2019/0155588 A1* | 5/2019 | Panchomarthi | G06N 20/20 |
| 2019/0244138 A1* | 8/2019 | Bhowmick | H04L 67/10 |
| 2019/0392075 A1* | 12/2019 | Han | G06N 20/00 |
| 2020/0034665 A1* | 1/2020 | Ghanta | G06N 20/00 |
| 2020/0043005 A1* | 2/2020 | Varma Damodaran | G06F 16/908 |
| 2020/0104737 A1* | 4/2020 | Abaci | G06N 7/005 |
| 2020/0133753 A1* | 4/2020 | Olson | G06F 11/008 |

OTHER PUBLICATIONS

Khanum, M. et al., "A Survey on Unsupervised Machine Learning Algorithms for Automation, Classification and Maintenance," International Journal of Computer Applications, Jun. 2015, pp. 34-39, vol. 119, No. 13.

* cited by examiner

400

| Rule No. | Rule Name | Rule Family | Model Types | Criticality | Warning Score |
|---|---|---|---|---|---|
| 1.1 | Model Goodness-of-fit Metrics-General | Goodness-of-fit | S, ML | Critical | 20 |
| 1.2 | Model GOF Metrics-Forecast | Goodness-of-fit | F | Critical | 20 |
| 1.3 | Model Fit Information Criterion | Goodness-of-fit | S, F | Warning | 1 |
| 1.4 | Model Residual Distribution Check | Goodness-of-fit | S, ML, F | Warning | 1 |
| 1.5 | Model Residual Distribution Normality Check | Goodness-of-fit | S, F | Warning | 1 |
| 1.6 | Model Residual Autocorrelation Check | Goodness-of-fit | S, F | Warning | 1 |
| 1.7 | Model Residual Stationarity Check | Goodness-of-fit | F | Warning | 1 |
| 1.8 | Change In Seasonality Check | Goodness-of-fit | F | Warning | 1 |
| 1.9 | Theil Inequality Coefficient Check | Goodness-of-fit | F | Warning | 1 |
| 1.10 | Model Coefficient Value Check | Goodness-of-fit | S, F | Warning | 1 |
| 1.11 | Model Coefficient Significance Check | Goodness-of-fit | S, F | Warning | 1 |
| 2.1 | Model Prediction Accuracy Check | Prediction Accuracy | ML, S | Warning | 1 |
| 2.2 | Forecast Accuracy Check | Prediction Accuracy | F | Critical | 10 |
| 3.1 | Model Prediction Stability Check | Prediction Stability | ML, S | Critical | 10 |
| 3.2 | Forecast Stability Check | Prediction Stability | F | Critical | 10 |
| 4.1 | Input Data Structure Check | Input Data | S, ML, F | Critical | 10 |
| 4.2 | Input Data Historical Periods Check | Input Data | S, ML, F | Warning | 1 |
| 5.1 | Business Assumption Check | Business Assumption | S, ML, F | Warning/Critical | NA |

S: Statistical, ML: Machine Learning, F: Forecasting

| Rule No. | Rule Name | Rule Family | Model Types | Criticality | Warning Score |
|---|---|---|---|---|---|
| 1.1 | Model Goodness-of-fit Metrics-General | Goodness-of-fit | S, ML | Critical | 20 |
| 1.2 | Model GOF Metrics-Forecast | Goodness-of-fit | F | Critical | 20 |
| 1.3 | Model Fit Information Criterion | Goodness-of-fit | S, F | Warning | 1 |
| 1.4 | Model Residual Distribution Check | Goodness-of-fit | S, ML, F | Warning | 1 |
| 1.5 | Model Residual Distribution Normality Check | Goodness-of-fit | S, F | Warning | 1 |
| 1.6 | Model Residual Autocorrelation Check | Goodness-of-fit | S, F | Warning | 1 |
| 1.7 | Model Residual Stationarity Check | Goodness-of-fit | F | Warning | 1 |
| 1.8 | Change In Seasonality Check | Goodness-of-fit | F | Warning | 1 |
| 1.9 | Theil Inequality Coefficient Check | Goodness-of-fit | F | Warning | 1 |
| 2.2 | Forecast Accuracy Check | Prediction Accuracy | F | Critical | 10 |
| 3.2 | Forecast Stability Check | Prediction Stability | F | Critical | 10 |
| 4.1 | Input Data Structure Check | Input Data | S, ML, F | Critical | 10 |
| 4.2 | Input Data Historical Periods Check | Input Data | S, ML, F | Warning | 1 |
| 5.1 | Business Assumption Check | Business Assumption | S, ML, F | Warning/ Critical | NA |

S: Statistical, ML: Machine Learning, F: Forecasting

| Rule No. | Rule Name | Rule Family | Model Types | Criticality | Warning Score |
|---|---|---|---|---|---|
| 1.1 | Model Goodness-of-fit Metrics-General | Goodness-of-fit | S, ML | Critical | 20 |
| 1.3 | Model Fit Information Criterion | Goodness-of-fit | S, F | Warning | 1 |
| 1.4 | Model Residual Distribution Check | Goodness-of-fit | S, ML, F | Warning | 1 |
| 1.5 | Model Residual Distribution Normality Check | Goodness-of-fit | S, F | Warning | 1 |
| 1.6 | Model Residual Autocorrelation Check | Goodness-of-fit | S, F | Warning | 1 |
| 1.10 | Model Coefficient Value Check | Goodness-of-fit | S, F | Warning | 1 |
| 1.11 | Model Coefficient Significance Check | Goodness-of-fit | S, F | Warning | 1 |
| 2.1 | Model Prediction Accuracy Check | Prediction Accuracy | ML, S | Warning | 1 |
| 3.1 | Model Prediction Stability Check | Prediction Stability | ML, S | Critical | 10 |
| 4.1 | Input Data Structure Check | Input Data | S, ML, F | Critical | 10 |
| 4.2 | Input Data Historical Periods Check | Input Data | S, ML, F | Warning | 1 |
| 5.1 | Business Assumption Check | Business Assumption | S, ML, F | Warning/Critical | NA |

S: Statistical, ML: Machine Learning, F: Forecasting

| Rule No. | Rule Name | Rule Family | Model Types | Criticality | Warning Score |
|---|---|---|---|---|---|
| 1.1 | Model Goodness-of-fit Metrics-General | Goodness-of-fit | S, ML | Critical | 20 |
| 2.1 | Model Prediction Accuracy Check | Prediction Accuracy | ML, S | Warning | 1 |
| 3.1 | Model Prediction Stability Check | Prediction Stability | ML, S | Critical | 10 |
| 4.1 | Input Data Structure Check | Input Data | S, ML, F | Critical | 10 |
| 4.2 | Input Data Historical Periods Check | Input Data | S, ML, F | Warning | 1 |

S: Statistical, ML: Machine Learning, F: Forecasting

FIG. 8

AUTOMATED QUALITY CHECK AND DIAGNOSIS FOR PRODUCTION MODEL REFRESH

CROSS REFERENCE TO RELATED APPLICATION

This application claims the benefit of U.S. Provisional Application No. 62/847,502, filed May 14, 2019, which is incorporated by reference in its entirety.

TECHNICAL FIELD

The subject matter described generally relates to model maintenance and, in particular, to automatically checking the quality of a model.

BACKGROUND

As a data science project moves into production and scales up across countries and products, the amount of work involved in maintaining the models over time increases accordingly. Production models tend to deteriorate over time due to shifts in trends or patterns in the data. Model maintenance keeps the quality and predictive accuracy of the model within acceptable limits when refreshed and applied to new data. As the current methods of maintenance generally involve data scientists manually monitoring, testing, and validating the model quality to detect any degradation, model maintenance can become a highly time- and labor-intensive process. This can become prohibitive for large scale data science projects involving a large number of customized models. Existing maintenance methods are generally reactive rather than proactive.

SUMMARY

Quality check and model diagnostic for production models post-refresh can be automated using an early warning system. In various embodiments, the early warning system makes use of checks and rules (e.g., rules for model goodness-of-fit, prediction accuracy, prediction stability, input data, or business understanding). If any of the models show poor prediction accuracy, stability, or a violation of model assumptions, the rule is flagged. Users can choose the rules to apply to their models. The parameters for the rule checks can also be defined by the users to allow balancing of detection accuracy with false alarms.

The early warning system provides automated quality checks and diagnostic tools targeted at the maintenance stage to reduce human intervention during model refreshes. The objectives of implementing an early warning system may include: (1) performing a series of systematic statistical and algorithmic checks for accuracy, stability, and model assumptions validity; (2) providing a signal to automatically deploy well-performing models without human intervention, significantly reducing or in some cases eliminating the lead time between new data point availability and model refresh; (3) triggering a warning or alert for poor performing models to the data scientists for further investigation; (4) generating diagnostic reports to help data scientists assess the health of the model, identify sources of error, perform speedier root cause analysis, and quickly update/fix the model as appropriate; and (5) serving as a pre-cursor to "complete production model automation" as an upstream function/diagnostics tool for downstream model autotuning.

In one embodiment, the early warning system checks model quality and generates an alert when a risk score exceeds an alert threshold. The early warning system receives data related to a model monitored by the early warning system. The data includes an output of the monitored model. The early warning system then retrieves a set of rules that could be applied to the model (e.g., in a series of rule checks). For example, the model is a machine learning model and the set of rules are configured for assessing the performance of a machine learning model. The early warning system determines which rules checks that the model fails. Based on this subset of failed rules, the early warning system calculate a risk score for the model. If the risk score for the model exceeds an alert threshold, the early warning system generates an alert (e.g., to diagnose and update the model).

In some embodiments, the early warning system may oversee the model to an extent that the early warning system applies the model to input data and also checks the resultant outputs. The early warning system may reside on a server on a network and the model may be hosted by a computing device on the network. The computing device may transmit the data related to the model over the network to the server for the early warning system to analyze. In some embodiments, the data related to the model is received by the early warning system after a model refresh is executed. The model refresh may indicate the presence of new data in the output of the model (e.g., the model has output data that the early warning system has not yet received from the model), which in turn, allows the early warning system to perform a new assessment of the model. In some embodiments, the model is a statistical model, a machine learning model, a time series forecasting model, or a combination thereof. If the risk score exceeds the alert threshold, the early warning system may tune hyperparameters of the model to improve the model and reduce the risk score. In some embodiments, a contribution of a given rule of the set of rules to the calculation of the risk score is related to a criticality associated with the given rule. For example, rules with a criticality of "Critical" may have a greater impact on the risk score than rules with a relatively less alarming criticality of "Warning."

The early warning system may evaluate and calculate risk scores on a rule-by-rule basis such that the early warning system can determine if the sum of risk scores for any number of rules less than all the rules exceeds the alert threshold. In one embodiment, all the rules selected are tested individually and risk score associated with each rule is calculated. However, each rule does not necessarily need to be evaluated for an alert or report to be generated. For example, in another embodiment, the early warning system determines that a first calculated risk score associated with a first rule does not exceed the alert threshold and proceeds to calculate a second risk score associated with a second rule. If the early warning system determines that the sum of the first and second risk scores does exceed the alert threshold, it may generate an alert without calculating a third risk score for a third rule.

In some embodiments, the early warning system determines the rules that a model fails by performing tests on the received data that includes the output of the model. Each test performed may be characterized by at least one of the rules. The early warning system may calculate a risk score or an overall risk score for a model by summing risk sub-scores, each sub-score characterizing a degree to which the received data failed a respective rule. The alert is generated if the overall risk score is above the threshold.

In some embodiments, a user may disable a rule if an event is likely to occur that would lead to an improper application of the rule. For example, knowledge of an upcoming holiday may cause a model predicting consumer sales to give exceptional data that is not representative of usual consumer behavior. The user may disable a rule that would otherwise be checked in anticipation of a false alarm generated using the exceptional data. In some embodiments, the set of rules are applicable to different model types but no one rule is applicable to all model types. The early warning system may determine the difference between risk scores for two similar models and generate an alert if the determined difference exceeds a threshold difference. This alert may indicate that the quality of at least one of the two similar models is poor. To determine if two models are similar, the early warning system may compare model parameters, hyperparameters, or a combination thereof.

In some embodiments, the early warning system may generate a diagnostic report that includes the risk score, at least one of the rules for which the model failed or passed, a visual representation of the quality of the model over time, or a combination thereof. The report may be generated once all of the rules have been evaluated or responsive to the risk score exceeding the alert threshold. The early warning system may standardize the received data prior to applying the set of rules to the received data. For example, the received data may be pre-processed into a standard format prior to the application of rules to evaluate the model.

BRIEF DESCRIPTION OF DRAWINGS

The disclosed embodiments have advantages and features which will be more readily apparent from the detailed description, the appended claims, and the accompanying figures (or drawings). A brief introduction of the figures is below.

FIG. 4 is a table including example rules used by the early warning system, according to one embodiment.

FIG. 6 is a table showing a set of rules selected for an example use case in which multiple models forecast sales at multiple stores in a supermarket chain, according to one embodiment FIG. 7 is a table showing a set of rules selected for an example use case in which a linear regression model forecasts house prices, according to one embodiment.

FIG. 8 is a table showing a set of rules selected for an example use case in which an ensemble machine learning model classifies vehicle accident survival rates based on passenger attributes, according to one embodiment.

DETAILED DESCRIPTION

Figure 1:
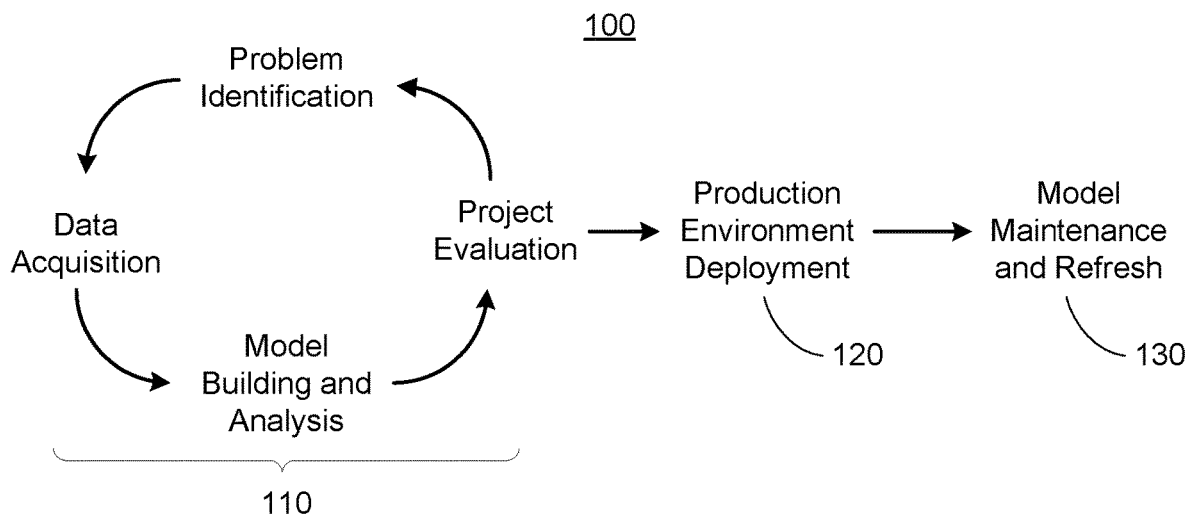
FIG. 1 illustrates a data science lifecycle, according to one embodiment.

The Figures (FIGS.) and the following description relate to preferred embodiments by way of illustration only. It should be noted that from the following discussion, alternative embodiments of the structures and methods disclosed herein will be readily recognized as viable alternatives that may be employed without departing from the principles of what is claimed.

Reference will now be made in detail to several embodiments, examples of which are illustrated in the accompanying figures. It is noted that wherever practicable similar or like reference numbers may be used in the figures and may indicate similar or like functionality. Similar or like elements may be referred to individually using the same reference numeral followed by a different letter, and collectively by the reference numeral alone. The figures depict embodiments of the disclosed system (or method) for purposes of illustration only. One skilled in the art will readily recognize from the following description that alternative embodiments of the structures and methods illustrated herein may be employed without departing from the principles described herein.

In some embodiments, parameters for the system can be automatically set. When a project scales to an extremely large number of models (e.g., one hundred SKUs across ten countries), even setting the parameters for each model to ensure detection accuracy and prevent false alarms can be a time-consuming task. A machine learning model can be trained on a smaller set of models with human-defined control parameters and used to predict suitable control parameters for the rest of models. Hence, models which are highly similar can have similar parameters set with little or no human input.

System Overview

Figure 2:
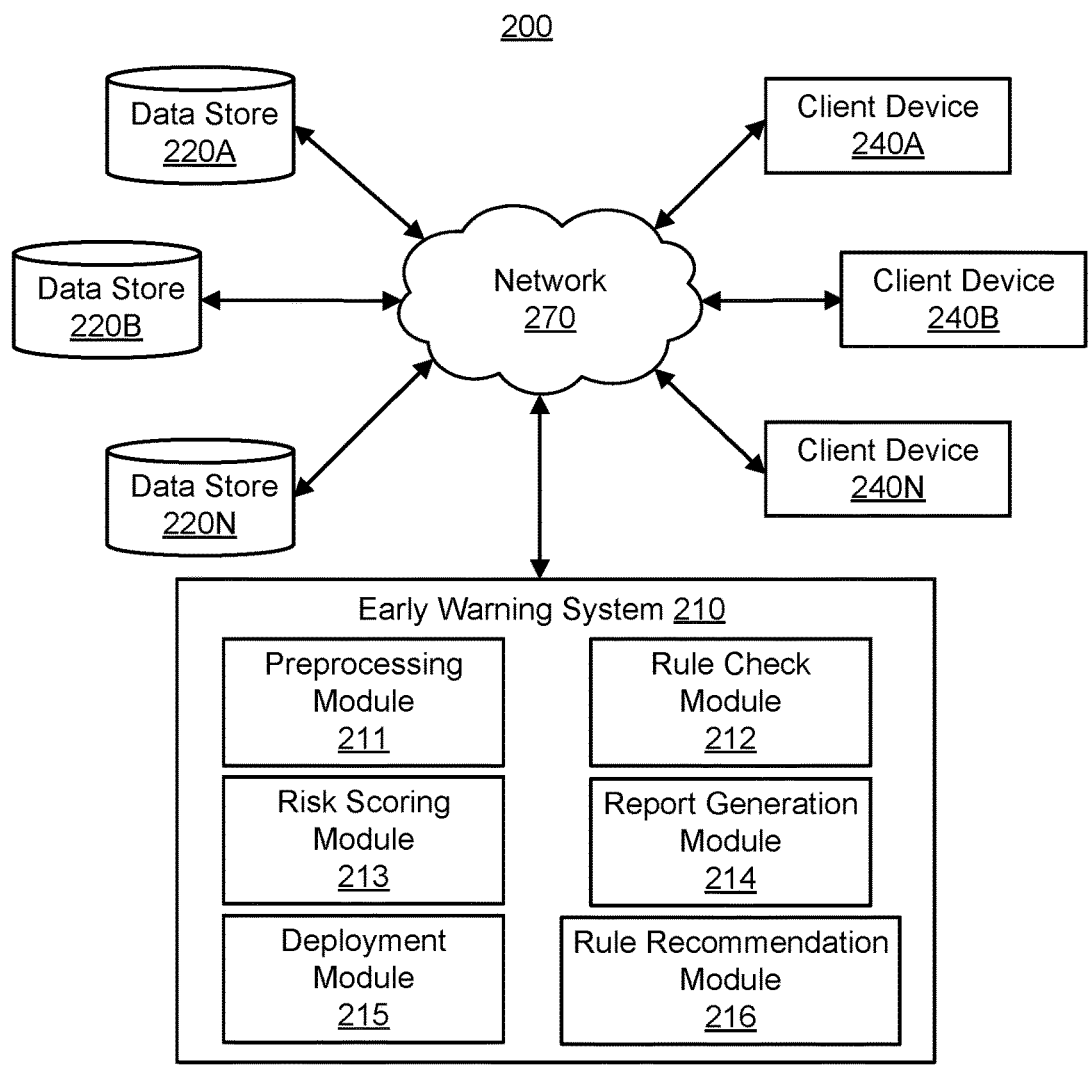
FIG. 2 is a block diagram of a networked computing environment suitable for providing automated quality check and diagnosis for production model refresh, according to one embodiment.

FIG. 2 illustrates one embodiment of a networked computing environment 200 suitable for providing automated quality checks and diagnosis of models. In the embodiment shown in FIG. 2, the networked computing environment 200 includes an early warning system 210, a set of data stores 220A-N, and a set of client devices 240A-N, all connected via a network 270. In other embodiments, the networked computing environment 200 contains different or additional elements. In addition, the functions may be distributed among the elements in a different manner than described. For example, all of the data used by the early warning system 210 may be stored in a single data store 220, which may be part of the early warning system 210 or accessed remotely via the network 270.

In one embodiment, the early warning system 210 ingests information from existing models, such as fitted and forecast values, model coefficients, residuals, and the like. The early warning system 210 applies a sequence of rules to a model and flags the rules that the model fails. The rule failures may be used to calculate an overall risk score. Based on the risk score, the early warning system 210 may generate diagnostic reports or automatically determine whether to deploy the model for further use or withdraw the model from deployment until further investigation can be conducted. As referred to herein, the term "rule" may be used interchangeably with the terms "check" or "rule check."

Considerations in the design of an early warning system include flexibility in managing varying use cases and model types, managing the trade-off between detection accuracy and false alarms, and ensuring ease of use and maintenance of the early warning system. As the checking of production models is a variable task in which the requirements can differ greatly from project to project, embodiments of an early warning system are general enough to cater to the needs of different models and data science projects. Providing sufficient flexibility to handle various model types while also retaining sufficient precision in detecting errors in the different models adds complexity to the early warning system 210. In one embodiment, the early warning system 210 caters to three types of model: forecasting models, statistical models, and machine learning models. In other embodiments, the early warning system 210 may cater to different or additional types of model.

The data stores 220 include one or more machine-readable media (e.g., non-transitory computer-readable media) configured to store data that is used or generated by the early warning system 210. In one embodiment, the data stores 220 include a model store for the models evaluated by the early warning system 210, a model data store for the data the models are applied to, and a model results store for the predictions or other outputs generated by the models.

The client devices 240 are computing devices with which users access view reports, warnings, or other outputs generated by the early warning system 210. The client devices 240 may also provide a user interface (UI) via which a user can take corrective action with regard to models the early warning system 210 identifies as having a high risk of being inaccurate or otherwise needing attention. In one embodiment, a client device 240 is a computer system, such as a desktop or a laptop computer. Alternatively, a client device 240 may be a device having computer functionality, such as a personal digital assistant (PDA), a mobile telephone, a smartphone, or another suitable device.

In one embodiment, data associated with a model and used by the early warning system 210 is stored in local memory of a client device 240. The client device 240 may host a model and send (e.g., via the network 270) the data output from the model to the early warning system 210 for quality check. For example, the early warning system 210 may be hosted by a remote server that is connected to the client device 240 via the network 270. In this case, the early warning system 210 may receive data output from locally-stored models on multiple client devices and monitor their respective models. Alternatively, one or more monitored models may be hosted on the same device that provides the early warning system 210. Although FIG. 2 shows a networked computing environment 200 with three client devices 240, any number of client devices may be included (including one).

The client devices 240 are configured to communicate via the network 270, which may include any combination of local area or wide area networks, using both wired or wireless communication systems. In one embodiment, the network 270 uses standard communications technologies or protocols. For example, the network 270 may include communication links using technologies such as Ethernet, 802.11, worldwide interoperability for microwave access (WiMAX), 3G, 4G, 5G, code division multiple access (CDMA), digital subscriber line (DSL), etc. Examples of networking protocols used for communicating via the network 270 include multiprotocol label switching (MPLS), transmission control protocol/Internet protocol (TCP/IP), hypertext transport protocol (HTTP), simple mail transfer protocol (SMTP), and file transfer protocol (FTP). Data exchanged over the network 270 may be represented using any suitable format, such as hypertext markup language (HTML) or extensible markup language (XML). In some embodiments, all or some of the communication links of the network 270 may be encrypted using any suitable technique or techniques.

The early warning system 210 monitors the health of one or more models using one or more risk metrics. The early warning system 210 may remove models from deployment or flag models for human review based on the risk metrics. In the embodiment shown in FIG. 2, the early warning system 210 includes a preprocessing module 211, a rule check module 212, a risk scoring module 213, a report generation module 214, a deployment module 215, a visualization module 216, and a rule recommendation module 216. In other embodiments, the early warning system 210 contains different or additional elements. In addition, the functions may be distributed among the elements in a different manner than described.

The preprocessing module 211 extracts relevant information for the existing models, such as fitted and forecast values, model coefficients, residuals, etc. In one embodiment, the data is extracted from the previous execution run to provide model attributes and prediction results data. The preprocessing module 211 may aggregate data over several runs to identify trends or provide a larger data set on which to perform analysis. The extracted data may be converted into a standard format to provide easy and efficient ingest by the other modules.

The rule check module 212 applies a set of rules to the pre-processed data. In one embodiment, the rule check module 212 sequentially applies each rule in the set to determine whether the model passes the rule check. These checks can be largely grouped under the major categories of checks for: model goodness-of-fit; prediction accuracy; prediction stability; input data; business understanding; and exceptions. The full list of rules may include rules for different model types and each rule may not be applicable for all models or use cases. Therefore, the set of rules applied may be a subset of all available rules. For example, a user or skilled data scientist may decide which rules, including rules that the data scientist decides to add, are applicable and implemented for a given model. For an ensemble of multiple different models (the early warning system 210 may consider a group of models, e.g. random forest/XGB, as one model), specific and relevant selected rule checks to be applied each of the sub-models. In other words, rules may be applied to check individual models before they are combined as well as to the ensemble.

A full list of rules may be provided to the user who can specify which rules to include in the set that is applied (e.g., by indicating rules to turn on and off). The user may also set custom parameters for the rule checks (e.g., to in configuration files). If parameters are not set, a default value can be used. In one embodiment, when the rule check model 212 applies rules, it takes in the configuration files and runs through the rule checks as specified by the configuration file. For each rule that fails, the result is stored in a binary matrix as a '1' and each rule that passes is stored into the matrix as a '0'. This matrix is passed to the risk scoring module 213. In other embodiments, other ways of storing rule check results may be used. Example rules used in one embodiment are described in greater detail below, with reference to FIG. 5.

The risk scoring module 213 calculates an overall risk score for a model based on individual risk scores assigned to rules that are flagged by the rule check module 212 for that model. In one embodiment, a risk score is given to each rule based on the criticality of that rule, where the criticality may be a user-specified or predetermined criticality level. If the rule is designated as an important check, the score given is high, while a less important check is given a lower score. The scores may be defined by the user or default values may be used. If a rule check fails, the score given to the check is added to the final overall score. The final score provides an indicative assessment of the health of the model and can be used as a comparison between models. In general, models with low risk scores are in good health while those with high risk scores require intervention. In other embodiments, other approaches to combining and representing risk scores may be used. For example, some risk scores might combine multiplicatively rather than additively.

In some embodiments, the early warning system 210 uses a threshold risk score to determine whether the model requires intervention. The early warning system 210 may determine whether the risk score exceeds the threshold risk score by performing rule-by-rule checks and risk score calculations, aggregating the rule-by-rule risk scores until the sum exceeds a threshold risk score (or all rule checks have been performed and the sum has not exceeded the threshold, in which case, the model is "healthy" and may be redeployed). For example, the rule check module 212 determines a model has failed a first rule and the risk scoring module 213 determines a first risk score that does not exceed the threshold risk score. The rule check module 212 then determines that the model has failed a second rule and the risk scoring module 213 determines a second risk score, sums the first and second risk scores, and determines that the sum exceeds the threshold risk score. The early warning system 210 may generate, responsive to the sum exceeding the threshold risk score, an alert to the user (e.g., via a diagnostic report) or attempt corrective maintenance of the model (e.g., by retraining the model with new hyperparameters).

In some embodiments, the early warning system 210 uses a threshold difference between risk scores to determine whether the model requires intervention. The early warning system 210 may determine the difference between risk scores of two similar models. The similarity of the models may be determined, by the early warning system 210, based on a comparison of at least one of respective model parameters or respective hyperparameters of the models. The early warning system 210 may generate, responsive to the determined difference exceeding a threshold difference, an alert indicating that at least one of the two similar models is performing poorly or is of poor model quality. In some embodiments, the early warning system 210 generates an alert responsive to a model failing a rule having a high criticality, a threshold number of low criticality rules, or a combination thereof.

Figure 5:
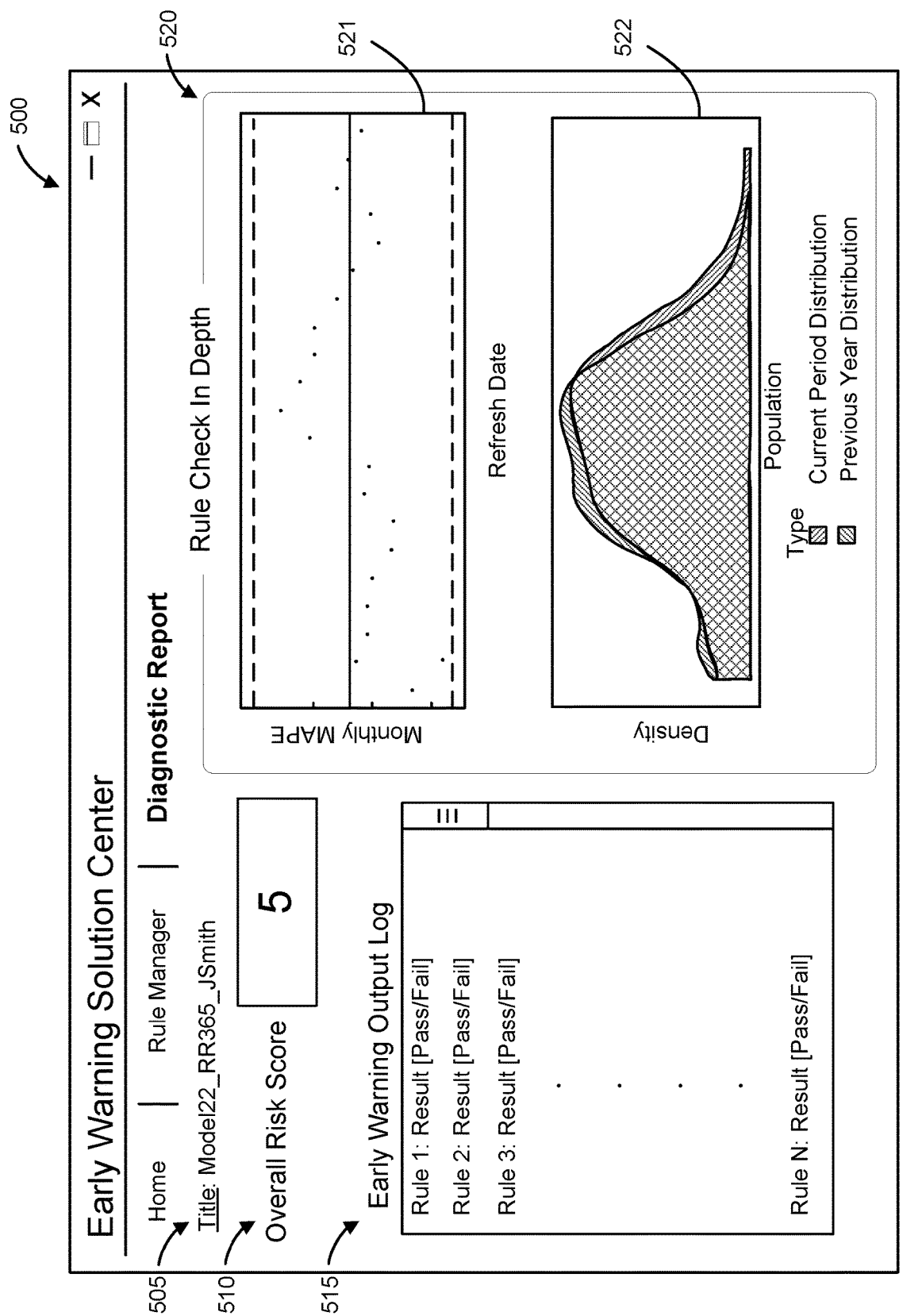
FIG. 5 shows an example graphical user interface (GUI) with a diagnostic report, according to one embodiment.

The report generation module 214 generates reports based on the risk scores to aid users in assessing the health of models and identifying sources of error. The reports may be generated if a risk score exceeds an alert threshold or regardless of the threshold (i.e., a report may be generated with each model refresh). The report includes information such as the overall risk score for a model, indicative rule check results, plots, and the like to make the rule check information assessable to users. In one embodiment, the diagnostic report is generated at the end of the rule check and includes the overall risk score and the checks that passed or failed at each layer of the model. The report may also include one or more charts and plots visualizing how the model has been performing over multiple refreshes. FIG. 5 depicts an example of a diagnostic report.

Additionally, or alternatively, the report generation module 214 generates one or more UIs to display results to users. For example, the report generation module 214 may provide a visualization dashboard for display at a client device 240 that includes identifiers of all a user's models along with the results generated. The UI may also include an indicator of the health (e.g., the overall risk score) of each model. The identifier might communicate the precise value of the risk score (e.g., on a dial or as a number) or just the level of risk, such as low, medium, or high, indicated by corresponding colored icons (e.g., green, yellow, or red, respectively).

The deployment module 215 determines what action to take regarding the model in view of the rule check results. In one embodiment, if the overall risk score is below a first threshold, the model is deemed healthy and redeployed. If the risk score is in a medium range (above the first threshold but below a second threshold), the model is still redeployed but a warning is generated regarding the quality of the model. This warning may be included in a report (e.g., as generated by the report generation module 214), sent directly to an identified user (e.g., as an email or instant message to the responsible data scientist), flagged with an indicator in a dashboard or other user interface (e.g., by placing a yellow caution sign next to an identifier of the model), or the like. If the risk score is above the second threshold (or if a rule check designated as critical individually failed), deployment of the refreshed model is stopped and a user alert is generated (e.g., in a similar manner to the warning described previously).

The rule recommendation module 216 identifies one or more rules to evaluate a model with. In some embodiments, the rule recommendation module 216 includes a machine learning model configured to output one or more rules responsive to an input of data representative of a use case or a model type. For example, the early warning system 210 receives a request for recommendation of rules to monitor the quality of a forecasting model and data characterizing the forecasting model as well as its use case (e.g., parameters of the model, the industry in which the model is deployed, etc.). In response, the rule recommendation module 216 may pre-process the data for input to the machine learning model. For example, the rule recommendation module 216 encodes the data into feature vectors for input to the machine learning model, where the elements of the feature vectors are numerical representations of the received data characterizing the forecasting model or its use case. The machine learning model identifies one or more rules that are mapped to the input feature vectors. The rule recommendation module 216 then outputs a recommendation including the one or more rules to a user (e.g., via a GUI).

In some embodiments, the early warning system 210 may perform automated model update and hyperparameter tuning. In addition to monitoring the quality of a model, the early warning system 210 may improve the quality of the model without user intervention by adjusting the model, applying the adjusted model to input data to obtain new output data, reapplying rule checks to the new output data, determine whether a risk score associated with the new output data warrants an alert indicating poor quality, and repeating this process until no alert is warranted. The early warning system 210 may adjust the model by updating the model (e.g., updating model parameters) or by hyperparameter tuning. In this way, the early warning system 210 functions as a completely (or substantially) autonomous production pipeline, where the early warning system 210 performs thorough checks and validation, and any noticeable degradation and identified root causes can be fixed with the appropriate automated model tuning functions. Similarly, a semi-autonomous pipeline may be used where the early warning system 210 automatically updates and redeploys the model if it can reduce the resulting risk score below a threshold and only flags the model for human intervention if the automated repair process fails to reduce the risk score below the threshold.

Figure 3:
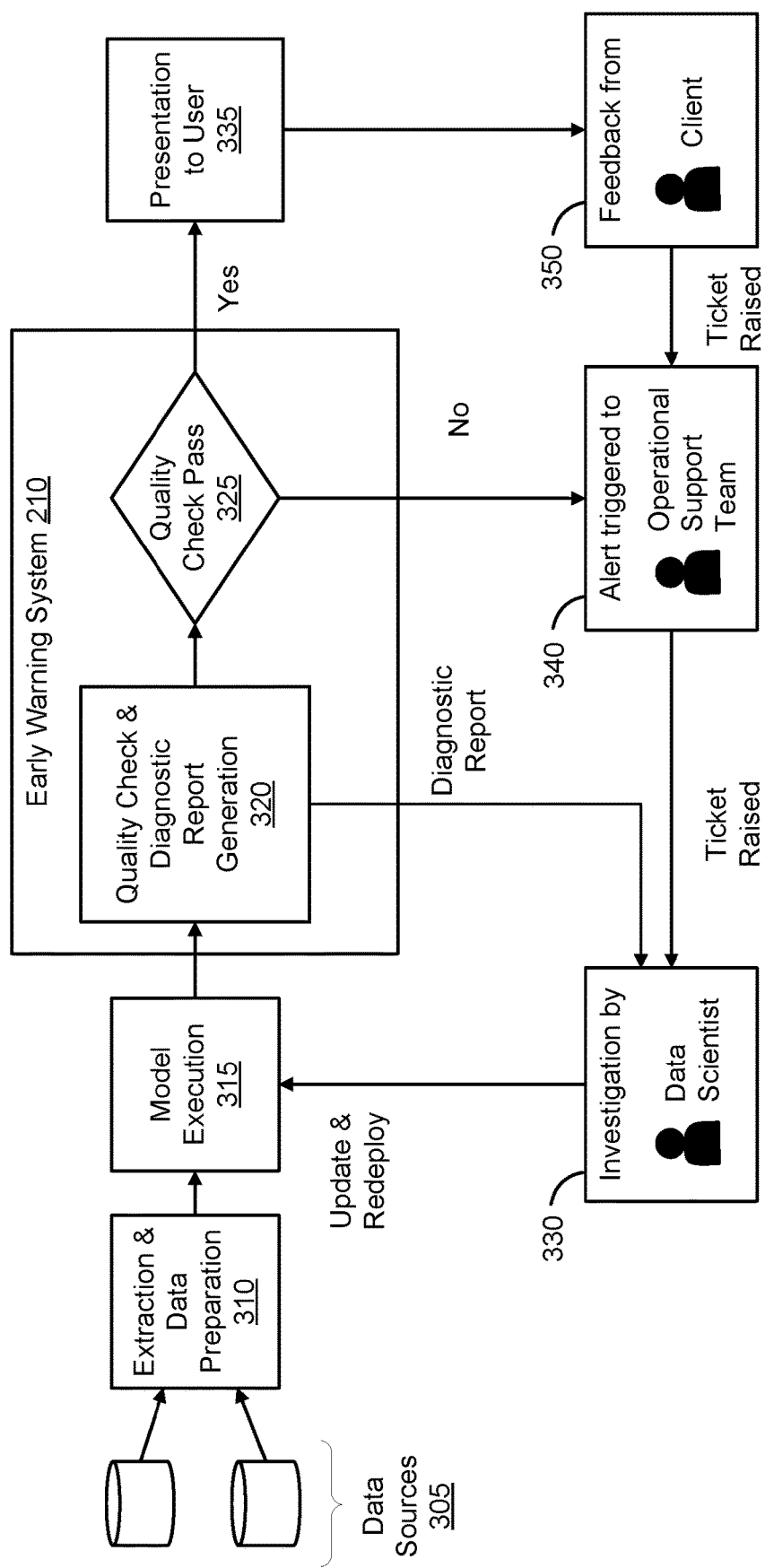
FIG. 3 illustrates the operation of the early warning system of FIG. 2, according to one embodiment.

FIG. 3 illustrates the operation of one example embodiment of the early warning system 210. In the embodiment shown, the early warning system 210 is integrated into the workflow of an existing, larger production environment 300. During each refresh, data is pulled from the data sources 305 and a script for extraction, loading, and transformation 310 of the data is run. A production model script takes in the cleaned data from the previous step and executes 315 previously trained models. The results of the execution 315 are fed to the early warning system 210, which checks 320 the quality of the models and generates 320 one or more diagnostic report (e.g., as described above with reference to FIG. 2). The result of the checks may indicate how well the existing models fit a new dataset. If the early warning system 210 determines 325 that the quality check passes, the model is automatically deployed 335 for presentation to a user on a visualization dashboard. If the quality check fails, an alert is sent 340 to the operational support team which informs the data scientists or any suitable user of the early warning system 210 to investigate 330. The data scientist may investigate 330 a model based on the diagnostic report generated 320, update the model as appropriate, and redeploy the model in the production environment for subsequent execution 315. The updated model may be checked again via the early warning system 210 to verify that it meets any required quality checks before being made available for presentation 335 on the visualization dashboard.

The checking 320 may include monitoring models for deviations from expected behavior. In some embodiments, the early warning system 210 monitors the performance of a model over time to ensure that the process is statistically in control or to identify special causes that results in out of control results. Statistical Process Control (SPC) is one method of monitoring the model. Control charts such as the Shewhart control chart may be used for SPC. Control limits of the chart may be set as certain number of standard deviations above and below the mean of the samples output from a model. These limits may be dependent on the use case of the model being checked. Additional rules for being statistically in-control can be added to supplement the control charts, each with different functions and detection ability. Example rules include: (1) one point is more than a threshold number of standard deviations from the mean; (2) a threshold number of consecutive data points are on the same side of the mean indicating a mean shift; and (3) a threshold number of consecutive data points are continually increasing or decreasing, forming a trend. One of skill in the art will appreciate that a wide range of such rules may be used.

Examples of rules used by the early warning system 210 to check 320 the quality of a model are shown in FIG. 4 and described in the corresponding description.

Early Warning System: Rules

FIG. 4 illustrates example rules for use by the early warning system 210, according to one embodiment. Each of rules 1.1-5.1 is associated with a rule family, a recommended model type, criticality level, and risk score (e.g., default settings for the application of rules for checking the quality of a model). For example, rule number 1.2 having a rule name "Model Goodness-of-fit Metrics—Forecast" and belonging to the rule family "model goodness-of-fit" is recommended for evaluating a forecasting model, recommended to have a criticality level of "critical," and recommended to have risk score of "20." Applying rule number 1.2 with recommended settings configured by the early warning system 210 may indicate that a forecasting model that fails rule 1.2 will be scored with a "critical" level score of 20.

The early warning system 210 may recommend a set of default rules that can be applied to evaluate a model type. Users may specify which rules to apply as an alternative to or in addition to the default. Models suitable for use with a particular rule may include: statistical models (e.g., linear regression, logistic regression, etc.); machine learning models (e.g., random forests, neural networks, etc.); and time series forecasting models (e.g., ARIMA, exponential smoothing, regression, etc.). Note that for complex time series forecasting methods, such as Bayesian Structural Time Series (BSTS) and neural networks for forecasting, some forecasting rules may apply while some may not.

In some embodiments, the early warning system 210 recommends default criticality levels for each rule. Users may specify which criticality levels to apply to a rule as an alternative to or in addition to the default level. In some embodiments, not at all rules have a criticality level applied. Recommendations for risk scores include critical rules and warning rules. A critical rule may be characterized with a relatively high risk score and may result in automatic failure (e.g., the model not being deployed without user intervention) if the model violates the critical rule. In contrast, a warning rule may be indicative of declining model quality and have a lower risk score. Thus, violating a warning rule may generate a notification to a user of possible model decline but not prevent automatic redeployment of the model.

In some embodiments, the early warning system 210 may recommend default values for risk scores. For example, a rule associated with a criticality level of "critical" is assigned a default risk score of "20" and a rule associated with a critical level of "warning" is assigned a default risk score of "1." In some embodiments, the early warning system 210 enables a user to define specific risk scores for a specific use case.

Rule 1.1, "Model Goodness-of-Fit Metrics—General," belongs to the "goodness-of-fit" rule family and is recommended for evaluating statistical models or machine learning models using a criticality level of "Critical" and risk score of 20. Metrics monitored and evaluated by the early warning system 210 for Rule 1.1 include cross validation accuracy, recall, and precision, area under the curve (AUC) of receiver operating characteristics (ROC), Davies-Bouldin Index, Dunn Index, or Silhouette Coefficient for clustering models, and any other user-defined metrics. The early warning system 210 can receive a user selection of a hard limit of the minimum acceptable metric value (e.g., at least 80% accuracy) that the model must meet to not violate the rule (e.g., calculated based on the training data). If the hard limit is not defined by users, the early warning system 210 may use a default value (e.g., three standard deviations above and below the mean of historical accuracy values). The early warning model 210 may reset the default every time a model is updated and changed (e.g., based on the new mean accuracy). The early warning model 210 may split training and test samples at a ratio of 4:1 by default. The early warning system 210 may determine that a model passes Rule 1.1 when the model goodness-of-fit metric is within limits defined by a user or default limits.

Rule 1.2, "Model Goodness-of-Fit Metrics—Forecast," belongs to the "goodness-of-fit" rule family and is recommended for evaluating forecasting models using a criticality level of "Critical" and risk score of 20. Metrics monitored and evaluated by the early warning system 210 for Rule 1.1 include mean absolute percentage error (MAPE), mean absolute deviation (MAD), cumulative sum of forecast errors (CUSUM), and user-defined metrics. The early warning system 210 may receive a user selection of a hard limit of the acceptable metric value (e.g., less than 5% MAPE)

that the model must meet to pass the rule (e.g., calculated based on the training data). If the hard limit is not defined by users, the early warning system 210 may use a default value (e.g., 3 standard deviations above and below the mean of historical values). The early warning system 210 may determine that a model passes Rule 1.2 when the model goodness-of-fit metric is within limits defined by a user or default limits.

Rule 1.3, "Model Fit Information Criterion," belongs to the "goodness-of-fit" rule family and is recommended for evaluating statistical models or forecasting models using a criticality level of "Warning" and risk score of 1. Model fit information criterion (e.g., Akaike information criterion (AIC), Bayesian information criterion (BIC), etc.) are monitored every refresh. The information criterion tends to worsen over time with each refresh of the data. If the information criterion shows a worsening of the fit by more than a fixed user defined threshold over a sustained period of refreshes, the early warning system 210 may generate a warning to inform users of the possible deterioration of the model. The early warning system 210 may determine a default threshold (e.g., an AIC increase of more than 5% consistently for more than 6 refresh periods) to determine whether to generate the warning. The early warning system 210 may determine that a model passes Rule 1.3 when the model goodness-of-fit metric is within a threshold defined by a user or a default threshold.

Rule 1.4, "Model Residual Distribution Check," belongs to the "goodness-of-fit" rule family and is recommended for evaluating statistical models, machine learning models or forecasting models using a criticality level of "Warning" and risk score of 1. The early warning system 210 may compare the distribution of model residuals against the distribution of historical model residuals from previous refreshes using the Anderson-Darling (AD) test. The early warning system 210 determines if the distribution of the residual has changed significantly (e.g., exceeding a threshold change amount) over the refreshes and generates a warning in response to determining significant change. The early warning system 210 may use default parameters to compare current residual distribution against previous refresher. For example, the early warning system 210 may compare the residual distribution at a time t against the immediately previous refresh at a time t–1 and an earlier refresh at time t–5. In this example, the early warning system 210 makes a comparison for t–1 to check for large, short term changes in distribution and a comparison for t–5 to check for long term drifts in distribution. The early warning system 210 may specify, for the AD test, a significance level (e.g., significance level of 0.05). The early warning system 210 may determine that a model passes Rule 1.4 when the P-value for AD test is more than the significance level (e.g., more than 0.05). This determination may prevent the early warning system 210 from rejecting a null hypothesis that the distributions are similar (e.g., with a confidence of 95%).

Rule 1.5, "Model Residual Distribution Normality check," belongs to the "goodness-of-fit" rule family and is recommended for evaluating regression (statistical) models or forecasting models using a criticality level of "Warning" and risk score of 1. The early warning system 210 may test the distribution of model residuals of the current refresh for normality using an AD test. The early warning system 210 may determine the normality of residuals and in turn, how well the model fits the data. The early warning system 210 may determine that a degree to which the model fits is proportionate to how close the model residuals exhibit a normal distribution. The early warning system 210 may specify, for the AD test, a significance level (e.g., significance level of 0.05). The early warning system 210 may determine that a model passes Rule 1.5 when the P-value for AD test is more than the significance level (e.g., more than 0.05). This determination may prevent the early warning system 210 from rejecting a null hypothesis that the current distributions is a sample of a normal distribution (e.g., with a confidence of 95%).

Rule 1.6, "Model Residual Autocorrelation Check," belongs to the "goodness-of-fit" rule family and is recommended for evaluating statistical models or forecasting models using a criticality level of "Warning" and risk score of 1. The early warning system 210 may test the distribution of model residuals of the current refresh using a Ljung-Box test. The early warning system 210 may use the independence and autocorrelation of residuals to determine a degree with which the model fits the data. For example, the early warning system 210 may determine that autocorrelation does not occur within the residuals and in response, determine that the model likely fits the data. The early warning system 210 may specify, for the Ljung-Box test, a significance level (e.g., significance level of 0.05). The early warning system 210 may determine that a model passes Rule 1.6 when the P-value for Ljung-Box test is more than the significance level (e.g., more than 0.05). This determination may prevent the early warning system 210 from rejecting a null hypothesis that the residuals are independently distributed (e.g., with a confidence of 95%).

Rule 1.7, "Model Residual Stationarity Check," belongs to the "goodness-of-fit" rule family and is recommended for evaluating forecasting models using a criticality level of "Warning" and risk score of 1. The early warning model system 210 may test the model residuals of the current refresh for stationarity using an Augmented Dickey-Fuller test. The early warning system 210 may apply this test to time series data and determine a degree with which the model fits the data. For example, the early warning system 210 may determine that residuals are stationary and in response, determine that the model likely fits the data. The early warning system 210 may specify, for the Augmented Dickey-Fuller test, a default significance level (e.g., significance level of 0.05). The early warning system 210 may determine that a model passes Rule 1.6 when the P-value for Augmented Dickey-Fuller test is less than the significance level (e.g., less than 0.05). This determination may prevent the early warning system 210 from accepting a null hypothesis that unit root is present and accordingly, that the series is not stationary (e.g., with a confidence of 95%).

Rule 1.8, "Change in Seasonality Check," belongs to the "goodness-of-fit" rule family and is recommended for evaluating forecasting models using a criticality level of "Warning" and risk score of 1. The early warning system 210 may test input time-series data with seasonality for changes in seasonality pattern. The early warning system 210 may subtract the seasonality pattern of previous refresh data from the current input data to determine the seasonality residuals. The early warning system 210 may determine, based on the presence of abnormal peaks in the residuals of the analysis, a change in seasonality. Significant changes in seasonality can impact the forecasts significantly. Accordingly, the early warning system 210 generates an alert to users, the alert including notifications of changes in seasonality patterns, to reduce the likelihood that the forecast model's performance deteriorates.

The early warning system 210 may detect peaks in seasonality residuals using a Z-score based peak detection algorithm. The algorithm uses a moving window that evaluates one data point at a time across a time series. The early warning system 210 may receive a user selection of the window size. The early warning system 210 calculates the mean and standard deviation for each window. The Z-score for each point may be calculated using the Z-score equation $$z = \frac{x - \overline{x}}{\sigma_x},$$

where $\overline{x}$ is the average of seasonality residuals. The Z-score also indicates the number of standard deviations a given point is away from the mean. In response to determining that the Z-score is above a threshold (e.g., in terms of number of standard deviations as defined by a user), the early warning system 210 may determine a signal of '1' for the time point. In some embodiments, the early warning system 210 may determine the signal is '0' for the time point responsive to determining that the Z-score is not above the threshold. These signals may indicate the presence of a positive or negative peak in the time series.

To increase the robustness of the algorithm, the early warning system 210 may use an influence parameter to adjust the influence of signals on the algorithm's control limits. For example, an influence of '0' indicates signals have no influence on the threshold, and stationarity of the timeseries is assumed. In contrast, an influence of '1,' in this example, allows the threshold to adjust to changes quickly. The early warning system 210 may use the influence parameter when signals lead to a structural break of the long-term average of the time series. Equations for this method include:

$$\overline{s}_i = \frac{1}{l} \sum_{j=1}^{i+1} s_j \quad \text{(Equation 1)}$$

$$\sigma_{s_i} = \sqrt{\frac{\sum_{j=1}^{i+1}(s_j - \overline{s}_i)^2}{l-1}} \quad \text{(Equation 2)}$$

$$s_i = kx_i + (1-k)s_{i-1} \quad \text{(Equation 3)}$$

$$z_i = \frac{x_i - \overline{s}_{i-1}}{\sigma_{s_{i-1}}} \quad \text{(Equation 4)}$$

$$y_i = \begin{cases} 1 & \text{if } |z_i| \geq th \\ 0 & \text{if } |z_i| \leq th \end{cases}$$

where $x_i$ is the value of time series at the point i, $s_i$ is the influence adjusted value, l is the amount of lag, k is the influence $0 \leq k \leq 1$, th is the threshold, and $y_i$ is the signal.

The early warning system 210 may use default parameters of lag (e.g., l=10), threshold (e.g., th=5 standard deviations), and influence (e.g., k=0). In some embodiments, the early warning system 210 uses larger lag values for stationary data and smaller lag values for fast moving data. The early warning system 210 may determine that a model passes Rule 1.8 when the signal values for the time series are 0 for the entire period of the time series (or a substantial portion of the time period).

Rule 1.9, "Theil Inequality Coefficient Check," belongs to the "goodness-of-fit" rule family and is recommended for evaluating forecasting models using a criticality level of "Warning" and risk score of 1. The early warning system 210 may check whether the Theil inequality coefficient of a forecast model is below a threshold (e.g., a user-specified threshold). In some embodiments, the early warning system 210 checks at least one of the decomposed bias, variance, or covariance proportion to increase the likelihood that the covariance is above the defined threshold.

The early warning system 210 may use the Thiel inequality coefficient, U, to measure the forecast quality. In some embodiments where $0 \leq U \leq 1$, the early warning system 210 may determine a high quality forecast responsive to determining that the Thiel inequality coefficient is '0.' The early warning system 210 may determine a bias proportion and use the determined bias proportion to determine how far the mean of the forecast is from the mean of the actual series. Similarly, the early warning system 210 may determine a variance proportion and use the determined variance proportion to determine how far the variation of the forecast is from the variation of the actual series. In some embodiments, the early warning system 210 may determine a covariance proportion representative of remaining unsystematic forecasting errors. Mathematical equations for the coefficient and proportions are:

$$\text{Thiel inequality coefficient } U = \frac{\sqrt{\sum_{t=1}^{n-1}\left(\frac{f_{t+1} - y_{t+1}}{y_t}\right)^2}}{\sqrt{\sum_{t=1}^{n-1}\left(\frac{y_{t+1} - y_t}{y_t}\right)^2}} \quad \text{(Equation 5)}$$

$$\text{Bias Proportion } U^B = \frac{(\overline{y} - \overline{f})^2}{\frac{1}{n}\sum_{t=1}^{n-1}(y_t - f_t)^2} \quad \text{(Equation 6)}$$

$$\text{Variance Proportion } U^V = \frac{(\sigma_f - \sigma_y)^2}{\frac{1}{n}\sum_{t=1}^{n-1}(y_t - f_t)^2} \quad \text{(Equation 7)}$$

$$\text{Covariance Proportion } U^C = \frac{2(1-\rho)\sigma_f\sigma_y}{\frac{1}{n}\sum_{t=1}^{n-1}(y_t - f_t)^2} \quad \text{(Equation 8)}$$

where $f_t$ is the forecast at time t, $y_t$ is the actuals at time t, n is the number of time periods, $\overline{y}$ is the mean of the actual value, $\overline{f}$ is the mean of the forecasts, $\sigma_y$ is the standard deviation of the actual values, $\sigma_f$ is the standard deviation of the forecasts, and $\rho$ is the correlation between the forecasts and actual values. The early warning system 210 may use default parameters for the Thiel inequality coefficient threshold (e.g., less than 0.2) and the covariance (e.g., greater than 0.8). The early warning system 210 may determine that a model passes Rule 1.9 when the Thiel inequality coefficient and covariance are within the defined thresholds.

Rule 1.10, "Model Coefficient Value Check," belongs to the "goodness-of-fit" rule family and is recommended for evaluating statistical models or forecasting models using a criticality level of "Warning" and risk score of 1. The early warning system 210 may monitor the model coefficients of the fitted models, using Rule 1.10, to increase the likelihood that the coefficients are stable and physically meaningful. Rule 1.10 may be suited for use cases where the model coefficients have a physical meaning used to derive insights or where the coefficients have certain expected values in real life.

The early warning system 210 may monitor based on statistical process control (SPC). The early warning system 210 monitors the values of coefficients against control limits of a number of standard deviations (e.g., 3 standard deviations) above and below the mean based on historical coefficient values. In response to determining that the coefficient is out of control limits, the early warning system 210 may generate a warning for the user. The early warning system 210 may monitor the coefficients for mean shift and trend. The early warning system 210 may determine that the coefficients have a threshold number of consecutive points above or below the mean (e.g., a threshold of 9 consecutive points), and generate, responsive this determination, a warning informing a user of the mean shift. In some embodiments, the early warning system 210 may use another threshold associated with a trend rather than with a mean shift. For example, the early warning system may generate a warning information the user of a trend or potential mean shift responsive to detecting a number of consecutive points above or below the mean meet this other threshold (e.g., a threshold of 6 consecutive points). The early warning system 210 may determine that a model passes Rule 1.10 responsive to determining that the model coefficients do not exhibit a mean shift or trend shift. In some embodiments, the early warning system 210 may determine that a model passes Rule 1.10 responsive to determining that the model coefficients are not out of control limits.

Rule 1.11, "Model Coefficient Significance Check," belongs to the "goodness-of-fit" rule family and is recommended for evaluating statistical models or forecasting models using a criticality level of "Warning" and risk score of 1. The early warning system 210 may monitor the significance of model coefficients using Rule 1.11. Rule 1.11 may be suited for use cases where the model coefficients have a physical meaning used to derive insights or where the model coefficients have certain expected values in real life. The early warning system 210 may test the significance of a model coefficient using a t-test for individual coefficients. In some embodiments, the model coefficient may be defined by a user. The early warning system 210 may test the overall model coefficients for significant using an f-test for regression models and a chi-square test for classification models. In some embodiments, the early warning system 210 may use a default significance level for the test (e.g., a significance level of 0.05). The early warning system 210 may determine that a model passes Rule 1.11 when the significance level for selected individual model coefficients or overall model coefficients are within the expected values.

Rule 2.1, "Model Prediction Accuracy Check," belongs to the "prediction accuracy" rule family and is recommended for evaluating statistical models or machine learning models using a criticality level of "Warning" and risk score of 1. The early warning system 210 provides, using Rule 2.1, an option to check for the accuracy of a model's latest predictions when data becomes available. For example, in a fraud detection and classification model, the early warning system 210 inputs new data points into the model to output a prediction for the current time period. Once the early warning system 210 verifies that the data is either fraudulent or not fraudulent, the early warning system 210 may receive new labeled data points. The early warning system 210 may then use the new labeled data points to determine the model's prediction action (e.g., by comparing the labeling to the previously output prediction). For the automatic classification of high-volume data, the early warning system 210 may receive a small sample of manually labeled data to check the accuracy of the model. In some embodiments, the requirement for this check is highly variable and in turn, the early warning system 210 may be less likely to provide a recommended default accuracy threshold setting for this check. In some embodiments, the early warning system 210 may prompt the user to provide an accuracy threshold setting. The early warning system 210 may determine that a model passes Rule 2.1 when the latest model predictions meet the accuracy threshold (e.g., as defined by user).

Rule 2.2, "Forecast Accuracy Check," belongs to the "prediction accuracy" rule family and is recommended for evaluating forecasting models using a criticality level of "Critical" and risk score of 10. The early warning system 210 may check, using Rule 2.2, the previously determined forecasts against new data when the new data becomes available. In some embodiments, the early warning system 210 defines two types of checks for Rule 2.2 that it may perform: a lag error check and a mean lag error check. The early warning system 210 may, based on the performance of either check, determine an error rate and compare it against a threshold (e.g., user-defined) to determine if the model has passed or failed Rule 2.2. The early warning system 210 may use a default threshold value (e.g., 0.1). In some embodiments, the early warning system 210 receives a user selection of the threshold value.

To perform the lag error check, the early warning system 210 may compare the actual value at current time t with the forecasted value at time t, where the forecast was made at a previous time, t-n. This may be described mathematically as:

$$\text{lag\_error}_t = \frac{|actual_t - forecast_{t,t-n}|}{actual_t} \quad \text{(Equation 9)}$$

The value of n may be user-defined to suit a particular use case. In some embodiments, the early warning system 210 uses a default value of n (e.g., n=2) if it has not received a user-defined value. The value of $\text{lag\_error}_t$ may be between 0 and 1, with 0 indicative of a perfect forecast.

The early warning system 210 may determine the mean lag error check by comparing the sum of three consecutive time periods ending at current time t with the forecasted values of the same three consecutive time periods made n time periods ago. This may be represented mathematically as:

$$\text{mean\_lag\_error}_t = \frac{\sum_{i=t-3}^{t} |actual_i - forecast_{i,t-n}|}{\sum_{i=t-3}^{t} actual_i} \quad \text{(Equation 10)}$$

The value of n may be user-defined to suit a particular use case. In some embodiments, the early warning system 210 uses a default value of n (e.g., n=5) if it has not received a user-defined value. The value of $\text{mean\_lag\_error}_t$ may be between 0 and 1, with 0 indicative of a perfect forecast. The early warning system 210 may determine that a model passes Rule 2.2 when the error terms are less than a defined threshold.

Rule 3.1, "Model Prediction Stability Check," belongs to the "prediction stability" rule family and is recommended for evaluating statistical models or machine learning models using a criticality level of "Critical" and risk score of 10. The early warning system 210 may check, using Rule 3.1, the stability of the model's predictions across different refreshes as the training data for the model changes. The early warning system 210 compares the model's predictions for the current time period to the model predictions of a previous time period. For classification models, the early warning system 210 may determine the stability accuracy rate based on the ratio of similarly classified data points to the total number of data points. This may be represented mathematically as:

$$\text{stability accuracy} = \frac{\text{count}(\hat{y}_t = \hat{y}_{t-1})}{\text{count}(\hat{y}_{t-1})} = \frac{\text{number of similarly classified points}}{\text{total number of data points}} \quad \text{(Equation 11)}$$

where $\hat{y}_t$ is the predicted values at time t.

For regression models or classification models associated with a probability of a class (e.g., using a percentage probability of each class), the early warning system 210 may determine the stability accurate rate based on the difference between the predictions of the previous time period t−1 and current time period t. This may be represented mathematically as:

$$\text{stability accuracy} = 1 - \frac{\sum_{i=1}^{n}|prediction_{i,t} - prediction_{i,t-1}|}{\sum_{i=1}^{n} prediction_{i,t-1}} \quad \text{(Equation 12)}$$

In some embodiments, the stability accuracy rate threshold may be user-defined. The early warning system 210 may use a default threshold (e.g., threshold of 0.9). The early warning system 210 may determine that a model passes Rule 3.1 when the model prediction stability accuracy meets the defined threshold.

Rule 3.2, "Forecast Stability Check," belongs to the "prediction stability" rule family and is recommended for evaluating forecasting models using a criticality level of "Critical" and risk score of 10. The early warning system 210 may check, using Rule 3.2, that the period-to-period change in forecast does not exceed a threshold (e.g., a user-defined threshold). The early warning system 210 may calculate the deviation between period-to-period forecasts by aggregating seasonal data by the number of periods per season (e.g. 12 for monthly, 4 for quarterly, 7 for weekly, 24 for hourly data). In some embodiments, the aggregation removes the effect of changes in seasonality, which will be accounted for in rule 1.8, "Change in seasonality check." The early warning system 210 may then calculate the deviation between forecasts from different refreshes for each aggregated period. For example, for monthly refreshed data, forecasts from the month of July data refresh for years 2019, 2020, 2021, 2022 will be compared against the August data refresh for years 2019, 2020, 2021, 2022, respectively. The early warning system 210 may determine deviation using:

$$deviation_t = \frac{|forecast_t - actual_t|}{actual_t} \quad \text{(Equation 13)}$$

The early warning system 210 may checks deviation in various ways. In some embodiments, the early warning system 210 checks whether the deviation of a current period is over a first threshold. The result of this check may indicate large, sudden deviations. Alternatively, or additionally, the early warning system 210 checks whether the deviation of previous, consecutive periods (e.g., the last three consecutive periods) is over a second threshold. The second threshold may be the same as or different from the first threshold used for the deviation check of the current period. The result of the deviation check for previous, consecutive periods may indicate smaller but more consistent deviations as compared to the current period's deviation. In some embodiments, the early warning system 210 may also check whether the sum of deviations from multiple, previous periods exceeds a third threshold. The third threshold may be the same as or different from any of the first or second thresholds. The result of the deviation check for the sum of deviations may indicate deviations that cumulatively add up to significant values over the multiple, previous periods. In some embodiments, the early warning system 210 uses default values for the thresholds. For example, the first threshold may be 0.05, the second threshold may be 0.03, and the third threshold may be 0.10. The early warning system 210 may determine that a model passes Rule 3.2 when the model forecast deviations meet stability thresholds defined.

Rule 4.1, "Input Data Structure Check," belongs to the "input data" rule family and is recommended for evaluating statistical models, machine learning models, or forecasting models using a criticality level of "Critical" and risk score of 10. The early warning system 210 may check, using Rule 4.1, that the input data is the same between different refreshes. Rule 4.1 is suitable for the early warning system's automated model refreshes because changes in the data structure may result in poor model fits that go undetected if a computer script does not throw an error. The early warning system 210 may check the input data for one or more of missing critical columns, changes in data class within columns, or any suitable criteria (e.g., unexpected "NA" or "0" values within columns). In some embodiments, the critical columns that the early warning system 210 evaluates for Rule 4.1 may be defined by a user. The early warning system 210 may determine that a model passes Rule 4.1 responsive to determining that the input data structure is unchanged or determining that the changes are not significant (e.g., compared to a threshold associated with user-defined criteria).

Rule 4.2, "Input Data Historical Periods Check," belongs to the "input data" rule family and is recommended for evaluating statistical models, machine learning models, or forecasting models using a criticality level of "Warning" and risk score of 1. The early warning system may check, using Rule 4.2, whether newly received data contains data that is new and does not contain modified versions of previously received data. In some embodiments, modified versions of previous received data are from a data source (e.g., a model that has been updated to account for changes in assumptions, data collection, or processing methodology, or to adjust for accuracy) that has retrospective adjusted data it has previously provided. The early warning system 210 may determine that a model passes Rule 4.1 in response to determining that the historical data points of the present input data are unchanged.

Rule 5.1, "Business Assumption Check," belongs to the "business assumption" rule family and is recommended for evaluating all models (e.g., a statistical model, machine learning model, forecasting model, statistical regression model, or regression model) using a criticality level of either "Warning" or "Critical," depending on the business assumption. In some embodiments, the early warning system 210 does not associate a risk score of with Rule 5.1 or associates a risk score of "NA" (e.g., "not applicable"). The early warning system 210 may check, using Rule 5.1, a model for any expected business assumption. As referred to herein, a "business assumption" or a "business understanding" is a characteristic of the context in which a business operates.

For example, a limit on the yearly amount of an item that may be imported into a country for sale may be a business assumption. The business assumption may affect the model's operation or the model's output. For example, a prediction model cannot output that the likely number of the imported items sold within the year exceeds the amount imported into the country, assuming the amount of the item existing in the country at the time of import was zero. In another example, a business assumption specifies that a forecast cannot be growing at an exponential rate. The early warning system 210 may receive user-defined business assumptions. The business assumptions may be applicable on a case-by-case basis, where this basis may also be user-defined. The early warning system 210 may determine that a model passes Rule 5.1 when the model or model output meets business assumptions.

Exceptions

Exceptions to the rules due to expected events may be applied by the early warning system 210. For example, the early warning system 210 may provide a user with an option to enable and disable certain rules that they know or expect will be violated due to predicted future events. The early warning system 210 may allow the user to define exceptions and apply the exceptions on a case-by-case basis.

Early Warning System: Diagnostic Report

FIG. 5 shows an example graphical user interface 500 with a diagnostic report, according to one embodiment. A diagnostic report may be generated by the early warning system 210 at the end of a rule check to provide the results to a user. The report may include pertinent information such as the overall risk score 510, an output log 515 listing tests that the model has passed or failed at each or at least one layer of the model, or a detailed rule check analysis section 520 that includes charts and plots to visualize how the model was performing over the different refreshes. In one embodiment, the diagnostic report is in an R markdown format. The early warning system 210 may generate the report for display in a dashboard (e.g., provided as an R markdown file) or made available to users in any other appropriate way, depending on the needs of the use case. For example, if the frequency of model refresh is weekly or less, an R markdown report may be sufficient, but if the model refresh is done more frequently, a dashboard may be preferable.

In one embodiment, a diagnostic report includes a title 505, an overall risk score 510, an early warning output log 515, and a detailed rule check analysis section 520 with individual rule check details. The title 505 may identify the models checked, refresh date, author, and date performed and is typically unique for each report. The overall risk score 510 is indicative of the model's health. For example, the higher the score, the poorer the model health, with zero indicating a perfectly healthy model after refresh. The early warning output log 515 provides a high-level overview (e.g., a list) of the different rule checks applied and the corresponding results (e.g., pass or fail). For multi-model use cases, the report may also indicate which particular model failed any given check. The detailed rule check analysis section 520 provides additional information to aid troubleshooting (e.g., charts to aid user visualization of the results).

A chart 521 in the detailed rule check analysis section 520 shows an example visualization for Rule 1.2 of FIG. 4 for evaluating a model goodness-of-fit metric. The chart 521 depicts the monthly MAPE data used by the early warning system 210 to evaluate the model's goodness-of-fit. The chart 521 shows the mean (the central horizontal line) and the control limits of three standard deviations below and above the mean (the top and bottom horizontal lines). In this case, the model passes the rule check (using default parameters) because no month's MAPE is above or below the upper and lower thresholds, respectively.

A graph 522 shows an example visualization for Rules 1.4 and 1.5 of FIG. 4 for evaluating the model residual distribution check and the model distribution normality check, respectively. The graph 522 includes two overlaid distributions: one generated for the current period and the other corresponding to the previous twelve months. In this case, the model passes both checks (assuming an AD test at 0.05 significance is used). However, the model may fail other tests. For example, the model might fail example rule 2.2 (forecast accuracy check) because the forecast accuracy lag error is 0.12, which exceeds the default limit of 0.1.

Example Use Cases

FIGS. 6-8 depict three examples of use cases with different rule selections and different applications of the early warning system 210. One of skill in the art will recognize that many other use cases are possible with selection of appropriate rule sets. The three examples of use cases described are: forecasting of sales for multiple stores in a supermarket chain using multiple forecasting models; modeling of house prices based on house attributes using a regression model; and classification of vehicle accident survival rates based on passenger attributes using an ensemble machine learning model.

To simulate the continuous addition of new data points every time period, an initial model may be trained with only 70% of the data. The rest of the data may be added to the model 3% at a time over ten refreshes. For time series data, the last 30% may be kept and 3% of the data added in date order. For non-time series data, the data split may be made by random selection.

FIG. 6 illustrates a set of rules selected for forecasting sales at multiple stores in a supermarket chain, according to one embodiment. The forecasting of sales in multiple stores of a supermarket chain may be performed by fitting ARIMA models on historical sales data. The sales data may be broken down by store and by department. The data may be aggregated to get monthly sales by store level and models fitted using the auto.arima function in R. Sales forecasts for each store for the next 12 months can be created based on the fitted model. The rules included in the set are selected for their applicability to forecasting models or combined properties of providing a reliable estimation of model health in this particular scenario.

FIG. 7 illustrates a set of rules selected for forecasting Boston house prices, according to one embodiment. A simple linear regression model may be applied to historical data regarding Boston house prices to generate predictions of future house prices. Based on the analysis, the factors that are significant in the house prices can be identified and the magnitude of coefficient analyzed to understand the importance of each variable. The rules included in the set may be selected for their applicability to linear regression forecasting models or combined properties of providing a reliable estimation of model health in this particular scenario.

FIG. 8 illustrates a set of rules selected for using machine learning to classify vehicle accident survival rates based on passenger attributes, according to one embodiment. An ensemble of machine learning models (random forest, support vector machine (SVM), etc.) may be used to predict the survival of passengers based on passenger attributes. A focus of this model may be prediction accuracy. The rules included in the set may be selected for their applicability to machine learning classification models or combined properties of providing a reliable estimation of model health in this particular scenario.

Computing Machine Architecture

Figure 9:
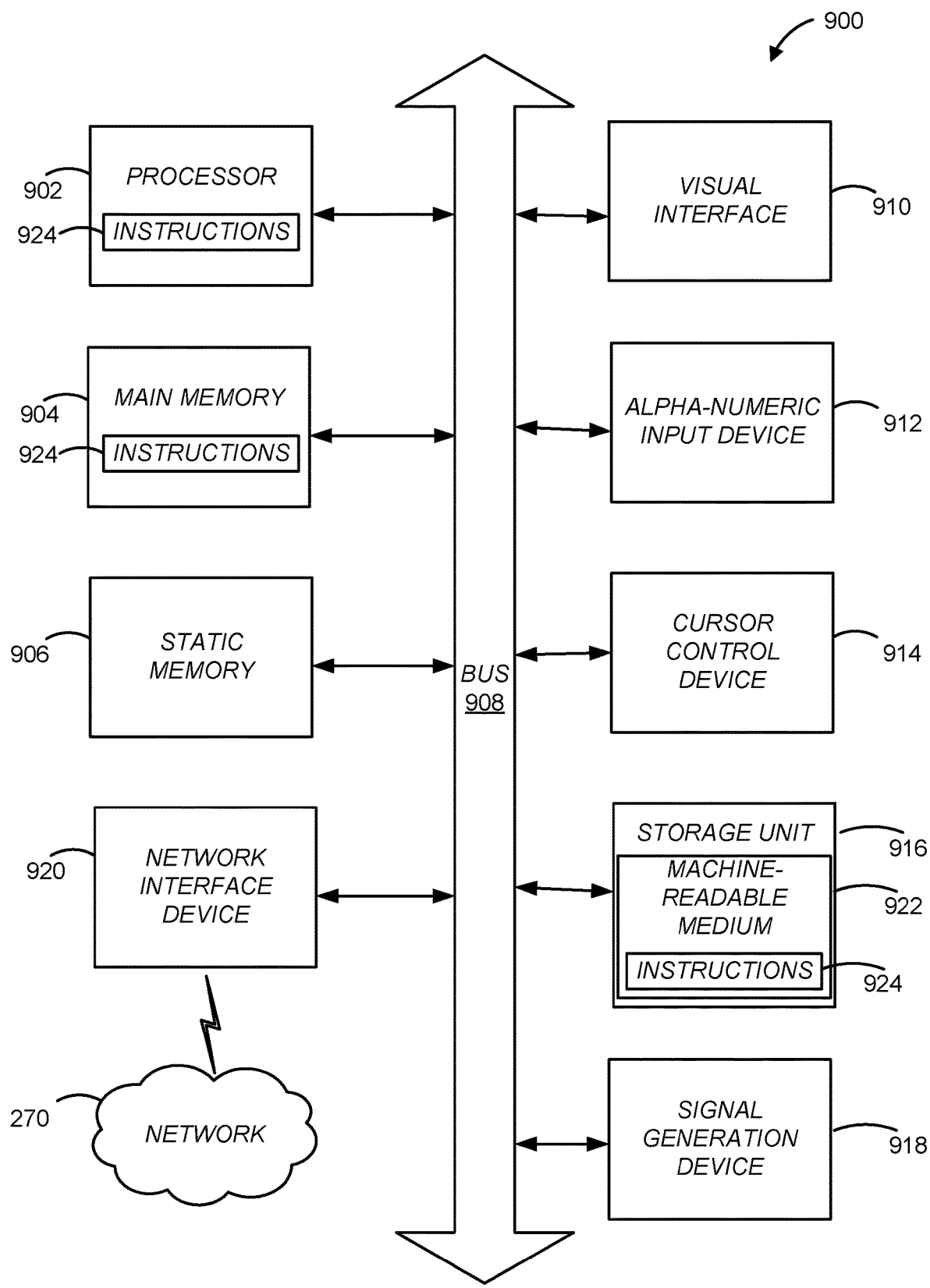
FIG. 9 a block diagram illustrating components of an example machine able to read instructions from a machine-readable medium and execute them in a processor (or controller), according to one embodiment.

FIG. 9 is a block diagram illustrating components of an example machine able to read instructions from a machine-readable medium and execute them in a processor (or controller). Specifically, FIG. 9 shows a diagrammatic representation of a machine in the example form a computer system 900, within which program code (e.g., software or software modules) for causing the machine to perform any one or more of the methodologies discussed herein may be executed. The program code may be comprised of instructions 924 executable by one or more processors 902. In alternative embodiments, the machine operates as a stand-alone device or may be connected (e.g., networked) to other machines. In a networked deployment, the machine may operate in the capacity of a server machine or a client machine in a server-client network environment, or as a peer machine in a peer-to-peer (or distributed) network environment or connected to a wide area network (WAN) allowing the system's alerts to be sent via email and text messages.

The machine may be a server computer, a client computer, a personal computer (PC), a tablet PC, a set-top box (STB), a personal digital assistant (PDA), a cellular telephone, a smartphone, a web appliance, a network router, switch or bridge, or any machine capable of executing instructions 924 (sequential or otherwise) that specify actions to be taken by that machine. Further, while only a single machine is illustrated, the term "machine" shall also be taken to include any collection of machines that individually or jointly execute instructions 924 to perform any one or more of the methodologies discussed herein.

The example computer system 900 includes a processor 902 (e.g., a central processing unit (CPU), a graphics processing unit (GPU), a digital signal processor (DSP), one or more application specific integrated circuits (ASICs), one or more radio-frequency integrated circuits (RFICs), or any combination of these), a main memory 904, and a static memory 906, which are configured to communicate with each other via a bus 908. The computer system 900 may further include visual display interface 910. The visual interface may include a software driver that enables displaying user interfaces on a screen (or display). The visual interface may display user interfaces directly (e.g., on the screen) or indirectly on a surface, window, or the like (e.g., via a visual projection unit). For ease of discussion the visual interface may be described as a screen. The screen can serve to display the model diagnostics reports from the early warning system. The visual interface 910 may include or may interface with a touch enabled screen. The computer system 900 may also include alphanumeric input device 912 (e.g., a keyboard or touch screen keyboard), a cursor control device 914 (e.g., a mouse, a trackball, a joystick, a motion sensor, or other pointing instrument), a storage unit 916, a signal generation device 918 (e.g., a speaker), and a network interface device 920, which also are configured to communicate via the bus 908.

The storage unit 916 includes a machine-readable medium 922 on which is stored instructions 924 (e.g., software) embodying any one or more of the methodologies or functions described herein. The instructions 924 (e.g., software) may also reside, completely or at least partially, within the main memory 904 or within the processor 902 (e.g., within a processor's cache memory) during execution thereof by the computer system 900, the main memory 904 and the processor 902 also constituting machine-readable media. The instructions 924 (e.g., software) may be transmitted or received over a network 270 via the network interface device 920.

While machine-readable medium 922 is shown in an example embodiment to be a single medium, the term "machine-readable medium" should be taken to include a single medium or multiple media (e.g., a centralized or distributed database, or associated caches and servers) able to store instructions (e.g., instructions 924). The term "machine-readable medium" shall also be taken to include any medium that is capable of storing instructions (e.g., instructions 924) for execution by the machine and that cause the machine to perform any one or more of the methodologies disclosed herein. The term "machine-readable medium" includes, but not be limited to, data repositories in the form of solid-state memories, optical media, and magnetic media.

Additional Considerations

With businesses constantly looking to improve efficiency in all operations using automation, an area that is often overlooked is the cost of maintaining predictive models. In some cases, businesses choose to let these models slowly deteriorate until they are no longer relevant. The early warning system described herein addresses this issue by automating a process previously performed by data scientists, freeing them up to perform other tasks at hand. Thus, the early warning system may achieve cost savings from lower manpower requirements during refresh. As model quality may be initially checked by a machine, human interventions may be focused on models that are detected to be of poor quality. The resulting time savings can translate to cost savings (e.g., by allowing use of a smaller team for maintenance).

The early warning system may also reduce the lead time from "data availability" to "updated model deployment." Manual model checking requires time and effort, with a data scientist performing each quality check (e.g., a model accuracy test, comparison with previous forecasts, verification against a dashboard, etc.). There is a physical limit to the speed at which a human can perform these tasks as compared to an automated script that may be scheduled to run as soon as new data is available. Hence, the lead time to deployment can be reduced from days to just hours, which can be valuable with projects where quick decisions are desirable.

The early warning system may also provide standardization of quality checks for the models. If quality checks are performed by different data scientists, there are generally minor differences in approach unless very rigorous standard operating procedures are developed. Removing human checks may also reduce the likelihood of human errors, where a false negative (determining the model to be good when it is not) will result in deteriorated models being deployed. Additionally, model maintenance can be a mundane and repetitive process for a data scientist and reducing the amount of maintenance work can have positive effect on employee work satisfaction.

The early warning system manages the trade-off between detection accuracy and false alarms. When the control parameters are more stringent, more anomalies in the models can be detected, but the number of false alarms rises correspondingly, and vice versa when the parameters are relaxed. However, the early warning system provides flexibility to adjust control parameters to obtain an optimized tradeoff between accurate anomaly detection and the number of false alarms. As every use-case has different levels of what is considered acceptable for detection accuracy and false alarms, various embodiments of the early warning system allow for customization so that users may decide which control parameters are appropriate in any given use case.

All-in-all, automating model quality checks may bring benefits such as lower manpower cost, shorter lead time to deployment, less incidents or erroneous results being produced (e.g., due to missed problems with models due to human error), and other indirect benefits.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of components, modules, or mechanisms. Modules may constitute either software modules (e.g., code embodied on a machine-readable medium or in a transmission signal) or hardware modules. A hardware module is tangible unit capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses) that connect the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or processors or processor-implemented hardware modules. The performance of certain of the operations may be distributed among the one or more processors, not only residing within a single machine, but deployed across one or more machines, e.g. computer system 900. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., application program interfaces (APIs).)

The performance of certain of the operations may be distributed among the one or more processors, not only residing within a single machine, but deployed across a number of machines. It should be noted that where an operation is described as performed by "a processor," this should be construed to also include the process being performed by more than one processor. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Some portions of this specification are presented in terms of algorithms or symbolic representations of operations on data stored as bits or binary digital signals within a machine memory (e.g., a computer memory). These algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. It should be understood that these terms are not intended as synonyms for each other. For example, some embodiments may be described using the term "connected" to indicate that two or more elements are in direct physical or electrical contact with each other. In another example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the invention. This description should be read to include one or at least one and the singular also includes the plural unless it is obvious that it is meant otherwise.

Upon reading this disclosure, those of skill in the art will appreciate still additional alternative structural and functional designs for a system and a process for automated quality check and diagnosis for production model refresh through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

What is claimed is:

1. A method for checking model quality, the method comprising:
   receiving data associated with a model, the received data comprising an output of the model;
   retrieving a set of rules applicable to the model;
   disabling a rule of the set of rules responsive to predicting that an event is likely to occur, the rule that is disabled being expected to fail responsive to applying the model to data from the event;
   determining a subset of the rules for which the model fails, the subset of the rules not including the rule that is disabled;
   calculating, based on the subset of the rules for which the model failed, a risk score for the model; and
   generating an alert responsive to the risk score exceeding an alert threshold.

2. The method of claim 1, further comprising applying the model to input data, wherein the output of the model is generated responsive to the application.

3. The method of claim 1, wherein the method is performed by a first computing device on a network and wherein the data associated with the model is transmitted over the network to the first computing device by a second computing device hosting the model.

4. The method of claim 1, wherein the data associated with the model is received responsive to an execution of a model refresh, the model refresh indicative of new data available to input into the model.

5. The method of claim 1, wherein the model is at least one of a statistical model, machine learning model, or time series forecasting model.

6. The method of claim 1, wherein the risk score is a first risk score, further comprising:
   calculating a second risk score for the model responsive to the first risk score failing to exceed the alert threshold; and
   generating the alert responsive to a sum of the first and second risk scores exceeding the alert threshold.

7. The method of claim 1, wherein determining the subset of rules for which the model failed comprises performing a plurality of tests using the received data, each test of the plurality of tests characterized by at least one rule of the subset of rules.

8. The method of claim 1, wherein calculating the risk score for the model comprises:

for each rule of the subset of rules, calculating a risk sub-score responsive to the received data failing the respective rule; and summing two or more of the calculated risk sub-scores to obtain the risk score.

9. The method of claim 1, wherein a contribution of a given rule to the risk score is based on a criticality associated with the given rule.

10. The method of claim 9, wherein the alert is automatically generated responsive to the model failing a rule associated with a high criticality or if the risk score exceeds the alert threshold.

11. The method of claim 1, wherein retrieving a set of rules applicable to the model comprises receiving a user selection of the set of rules.

12. The method of claim 1, wherein the set of rules includes at least one of model goodness-of-fit, prediction accuracy, prediction stability, input data, business understanding, exceptions, or user-defined rules.

13. The method of claim 1, wherein the model is a first model, further comprising determining a difference between the risk score for the first model and a risk score for a second model, wherein the threshold is defined relative to the risk score of the second model.

14. The method of claim 13, wherein the second model is determined to be similar to the first model based on a comparison of at least one of respective model parameters or respective hyperparameters.

15. The method of claim 1, further comprising, generating a diagnostic report comprising the risk score, at least one rule of the subset of rules for which the model failed or passed, or a visual representation of the quality of the model over time.

16. The method of claim 1, further comprising tuning a plurality of hyperparameters of the model to reduce the risk score responsive to the risk score exceeding the alert threshold.

17. The method of claim 1, further comprising updating model parameters of the model to reduce the risk score responsive to the risk score exceeding the alert threshold.

18. A system for checking model quality, the system comprising:
one or more processors; and
one or more non-transitory, computer-readable media storing code that, when executed by the one or more processors, causes the system to:
receive data associated with a model, the received data comprising an output of the model;
retrieve a set of rules applicable to the model;
disable a rule of the set of rules responsive to a prediction that an event is likely to occur, the rule that is disabled being expected to fail responsive to the model being applied to data from the event;
determine a subset of the rules for which the model fails, the subset of the rules not including the rule that is disabled;
calculate, based on the subset of the rules for which the model failed, a risk score for the model; and
generate an alert responsive to the risk score exceeding an alert threshold and a model diagnostics report.

19. A non-transitory computer-readable medium comprising stored instructions that, when executed by a computing device, cause the computing device to:
receive data associated with a model, the received data comprising an output of the model;
retrieve a set of rules applicable to the model;
disabling a rule of the set of rules responsive to predicting that an event is likely to occur, the rule that is disabled being expected to fail responsive to applying the model to data from the event;
determine a subset of the rules for which the model fails, the subset of the rules not including the rule that is disabled;
calculate, based on the subset of the rules for which the model failed, a risk score for the model; and
generate an alert responsive to the risk score exceeding an alert threshold.

20. The non-transitory computer-readable medium of claim 19, wherein the risk score is a first risk score, and the stored instructions further cause the computing device to:
calculate a second risk score for the model responsive to the first risk score failing to exceed the alert threshold; and
generate the alert responsive to a sum of the first and second risk scores exceeding the alert threshold.

* * * * *